No. 784,613. PATENTED MAR. 14, 1905.
G. W. BARNETT.
MAP CABINET.
APPLICATION FILED APR. 16, 1904.

2 SHEETS—SHEET 2.

Witnesses
E. F. Stewart
C. N. Woodward

George W. Barnett, Inventor.
by C. A. Snow & Co.
Attorneys

No. 784,613.

Patented March 14, 1905.

UNITED STATES PATENT OFFICE.

GEORGE W. BARNETT, OF CHICAGO, ILLINOIS.

MAP-CABINET.

SPECIFICATION forming part of Letters Patent No. 784,613, dated March 14, 1905.

Application filed April 16, 1904. Serial No. 203,512.

*To all whom it may concern:*

Be it known that I, GEORGE W. BARNETT, a citizen of the United States, residing at Chicago, in the county of Cook and State of Illinois, have invented a new and useful Map-Cabinet, of which the following is a specification.

This invention relates to cabinets or casings for holding maps and similar articles, and has for its object to provide a simply-constructed, conveniently-arranged, and easily-operated device of this character whereby any one of the maps or other articles may be drawn out when required independently of all the other articles and automatically returned to the case when not in use and protected from exposure to dust, moisture, and the like.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

Figure 1:
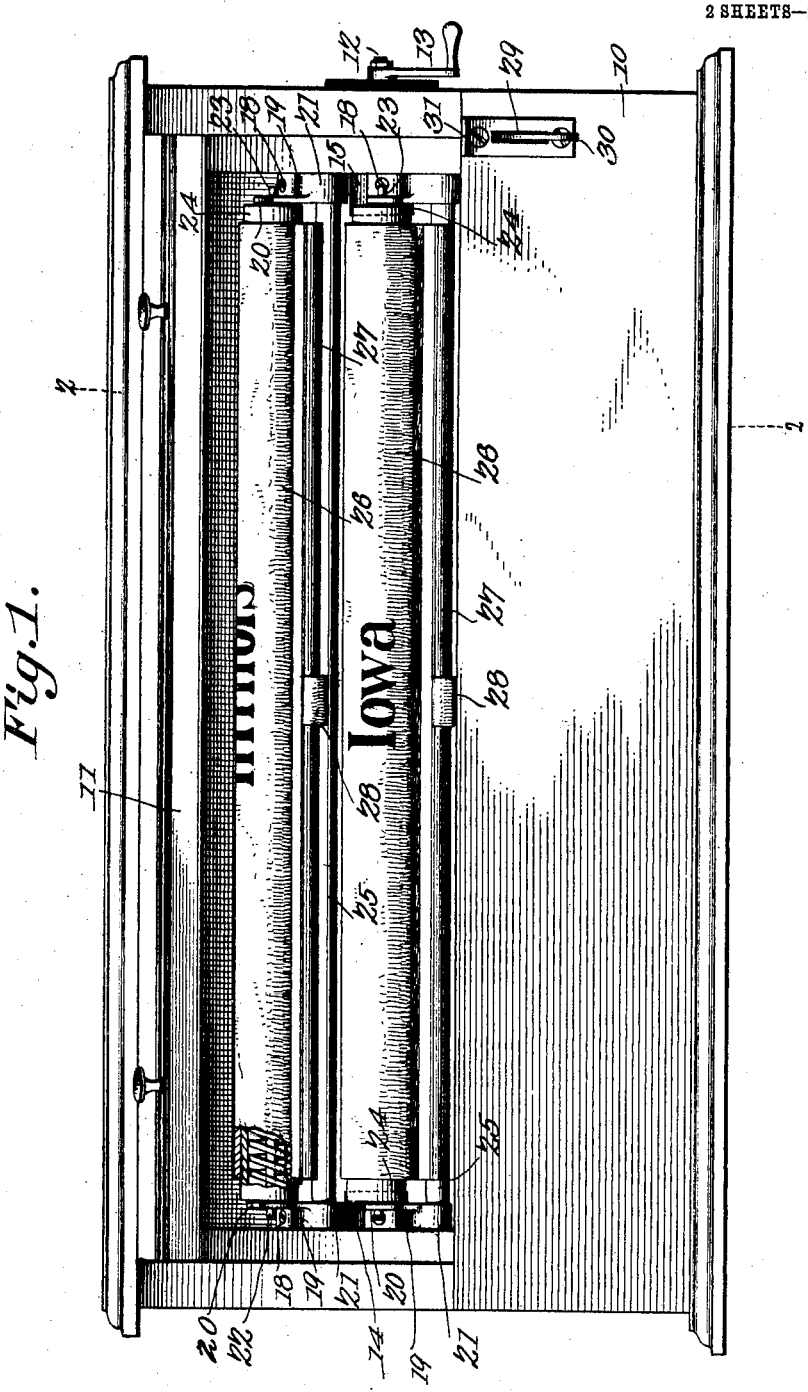
Figure 2:
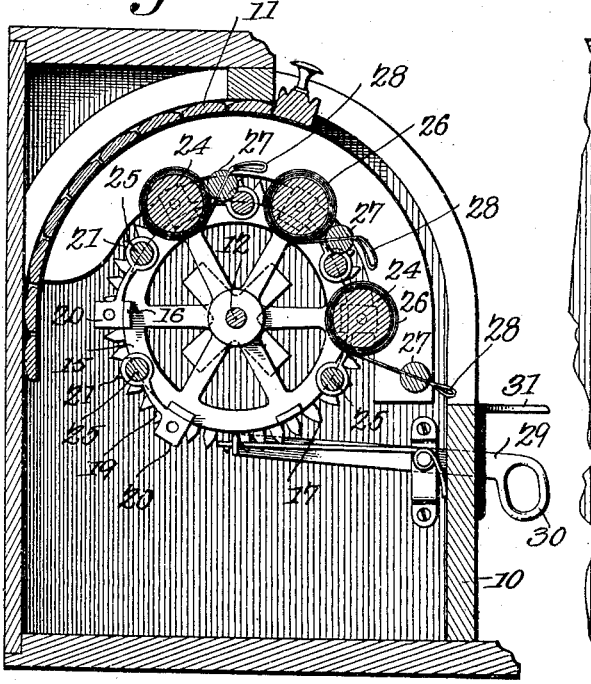
Figure 3:
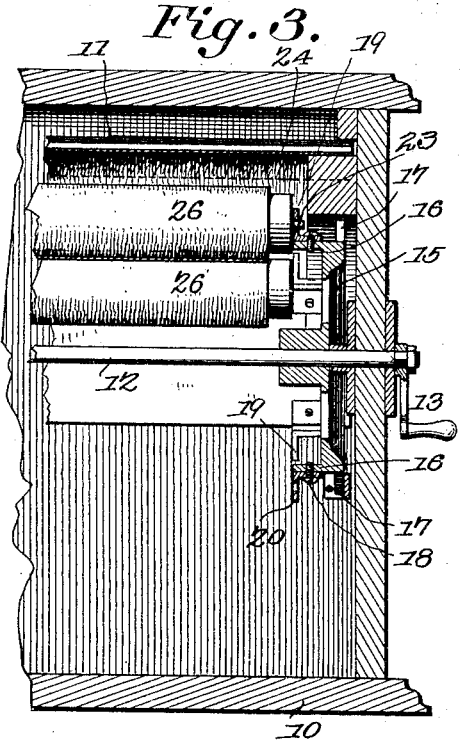
Figure 4:
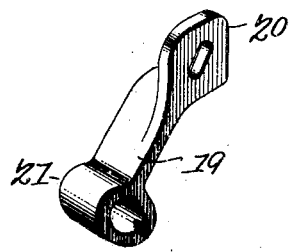
Figure 5:
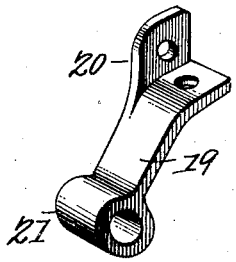

In the drawings thus employed, Figure 1 is a front elevation. Fig. 2 is a transverse section on the line 2 2 of Fig. 1. Fig. 3 is a longitudinal sectional detail. Figs. 4 and 5 are enlarged perspective views of the spring-roll brackets detached.

This improved device may be employed for holding maps, charts, samples of curtain material, wall-paper, oil-cloth or other fabrics, and similar articles, but for the purpose of illustration is shown arranged to support a series of maps, for which it is more particularly adapted.

The casing 10 may be of any desired form or size and of any desired material and of any suitable design and will be provided with a movable closure at one side, preferably in the form of a slatted flexible curtain 11 of the usual form. For the purpose of illustration a casing is shown to hold six of the map-rollers; but of course it will be understood that any required number may be employed. Mounted for rotation in the casing 10 is a shaft 12, having an operating-handle 13 outside the casing at one end. Rigidly connected to the shaft 12 adjacent to the inner faces of the ends of the casing are circular spider-frames 14 15, having circumferential spaced lugs 16 extending laterally from the frames. Attached to each of the lugs 16, as by clamp-screw 18, is a bracket 19, having at one end an ear 20 and at the other end a socket 21, the ears perforated to receive the bearings 22 23 upon the rollers 24 and the sockets to receive the ends of bars 25, extending between the frames 14 15 and parallel to the rollers. The rollers are of the ordinary spring form employed for window-shades, and the brackets are formed "rights and lefts," and the apertures in the brackets upon the frame 14 are elongated to receive the elongated or flattened bearings at the ratchet end of the rollers for obvious reasons.

The maps or other articles (indicated at 26) are attached by one end to their respective rollers and provided at their free ends with stop members or finder-strips 27, preferably in two semicircular parts and attached upon opposite sides of the map material. When the maps are wound up, these stop-strips engage the stop-bars 25 and the adjacent portions of the maps which have been wound upon the rollers, and the maps are thus prevented from being wound up to an undue extent and also are maintained in convenient position for use when required. Each map or other article will be provided with a finger-grip 28 and will have the title displayed on the back near the stop-strips, so that it will be in view when wound up.

A spring-controlled pawl 29 is pivoted to the end of the casing for engaging the teeth 17 and extends through the casing and terminates in a finger-grip 30 beneath a thumbrest 31. By this simple arrangement when the operator desires to consult any particular map or other article mounted upon any particular roller he releases the pawl 29 by pressing the terminal grip with the thumb and finger of one hand and rotates the handle 13 with the other until the desired map is in position opposite the opening in the casing, when the pawl is released to reëngage the nearest space between the teeth 17, which will hold the roller-frame stationary while the map is being used. When the map is no longer required, it can be automatically rolled up in the usual manner of operating a spring-roller curtain and the apron 11 closed.

It will be obvious that the maps or other articles can be very easily and quickly changed when required by merely loosening one of the clamp-screws 18 and drawing the bracket 19 outward and away from the roller, the latter removed, another substituted, and the bracket restored.

It will be seen that a very convenient and efficient device is produced admirably adapted for the purposes described and which may be readily adapted to holding various articles of a similar character, as before mentioned.

Having thus described my invention, I claim—

1. In a device of the class described, a shaft mounted for rotation and having frames spaced apart thereon and provided with spaced circumferential lateral lugs, roller-brackets connected to said lugs, rollers carried by the brackets, stop-bars extending between said frames adjacent to said rollers and supported in said brackets, means for rotating said shaft, and means for holding said shaft and its attachments stationary at certain predetermined points.

2. In a device of the class described, a shaft mounted for rotation, spaced frames carried thereby and provided with spaced circumferential lateral lugs, roller-brackets mounted on said lugs and provided with sockets, rollers carried by the brackets, stop-bars substantially parallel with the rollers and supported in the sockets of the roller-brackets, means for rotating the shaft, and means for holding the shaft stationary at predetermined points of its rotary movement.

3. In a device of the class described, an inclosing casing having a movable closure at one side, a shaft mounted longitudinally in said casing and having means operating exteriorly of said casing for rotating the shaft, frames spaced apart upon said shaft and partaking of its motion and provided with laterally-extending spaced circumferential lugs, roller-brackets detachably connected to said lugs, stop-bars extending between each opposite pair of brackets and parallel to said rollers, and means operating through said casing for holding said shaft and its attachments stationary at certain predetermined points.

4. In a device of the class described, a shaft mounted for rotation and having frames spaced apart thereon and provided with spaced circumferential lateral lugs, roller-brackets detachably connected to said lugs, rollers carried by the brackets, stop-bars extending between said frames and supported in said brackets, maps or like articles connected by one end to said rollers and having lateral stop members at their other ends for engagement with said stop-bars when the rollers are wound up, means for rotating said shaft and means for holding said shaft and its attachments stationary at certain predetermined points.

In testimony that I claim the foregoing as my own I have hereto affixed my signature in the presence of two witnesses.

GEORGE W. BARNETT.

Witnesses:
   FRED A. GATES,
   J. B. VAN KEUSEN.